United States Patent [19]
Smith
[11] 3,897,657
[45] Aug. 5, 1975

[54] METHOD OF MANUFACTURING CONTACT LENSES AND APPARATUS THEREFOR

[76] Inventor: Joseph H. Smith, 1600 Wyoming Ave., Forty Fort, Pa. 18704

[22] Filed: Sept. 13, 1973

[21] Appl. No.: 397,005

Related U.S. Application Data

[63] Continuation-in-part of Ser. Nos. 92,444, Nov. 24, 1970, abandoned, and Ser. No. 217,084, Jan. 12, 1972, abandoned, and Ser. No. 281,234, Aug. 16, 1972, Pat. No. 3,772,832.

[52] U.S. Cl. ...................... 51/125; 51/131; 51/160; 51/209 R; 51/284; 51/DIG. 34
[51] Int. Cl. ...................... B24b 1/00; B24b 13/00
[58] Field of Search .......... 51/124 L, 129, 131, 132, 51/209 R, 209 DL, 284, DIG. 34, 154, 160, 125

[56] References Cited

UNITED STATES PATENTS

| | | | |
|---|---|---|---|
| 2,990,664 | 7/1961 | Cepero | 51/284 |
| 3,087,284 | 4/1963 | Kratt | 51/284 X |
| 3,201,904 | 8/1965 | Evans | 51/131 X |
| 3,283,446 | 11/1966 | Feinbloom | 51/284 X |
| 3,583,111 | 6/1971 | Volk | 51/124 L X |

*Primary Examiner*—Donald G. Kelly

[57] ABSTRACT

For smoothing or blending the junctures between a central concave lens surface and one or more annular peripheral concave lens surfaces, wherein a convex tool is provided having a nonconvex circular portion, a polishing sheet is located on the tool covering the circular portion and adjacent portion, and the tool is rotated relative to the lens so that the sheet region overlying the circular portion effects smoothing of an annular juncture.

9 Claims, 4 Drawing Figures 35 10 25 30 40 12 28 29 23 20 37 39 36 38

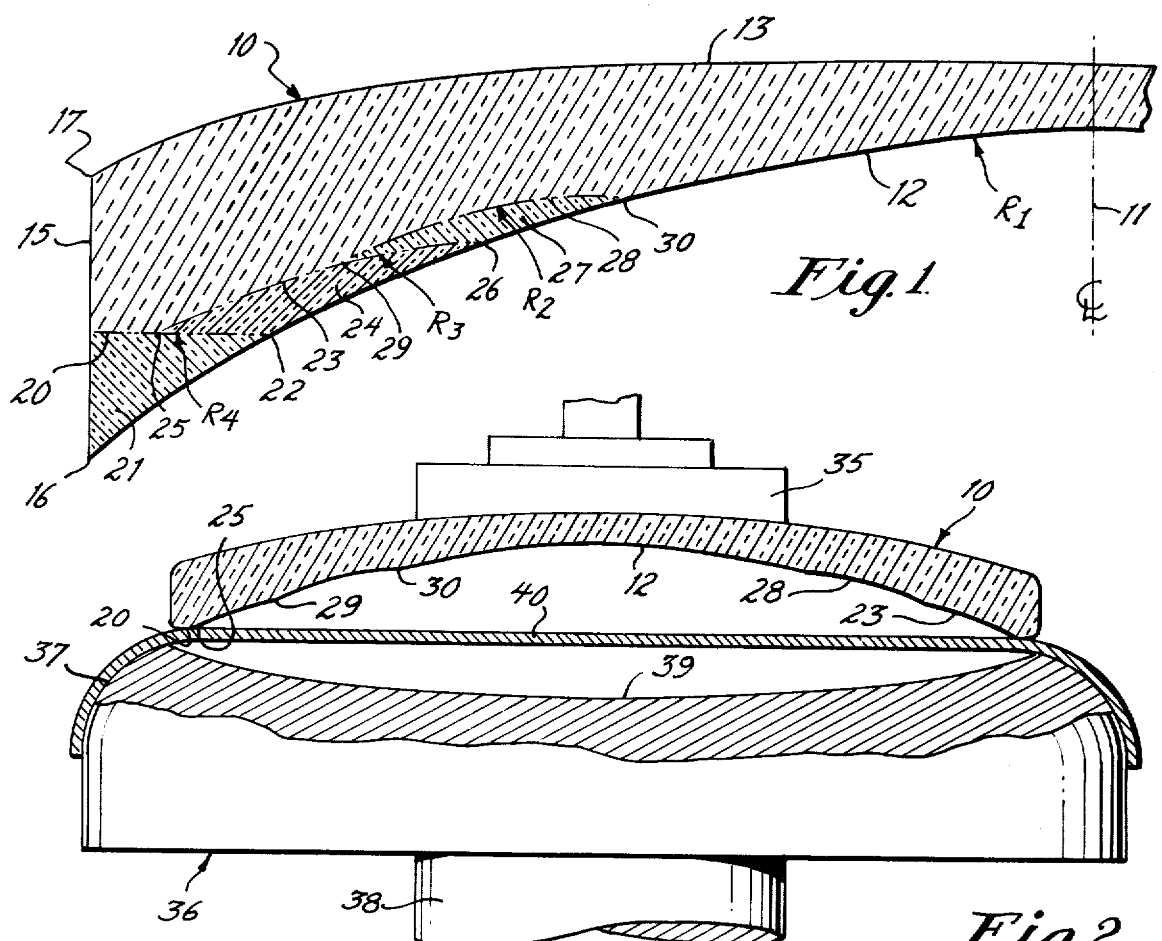
Fig.1.
Fig.2.
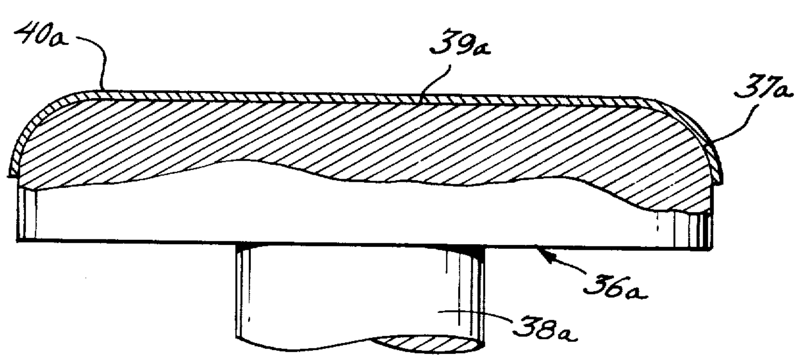
Fig.3.
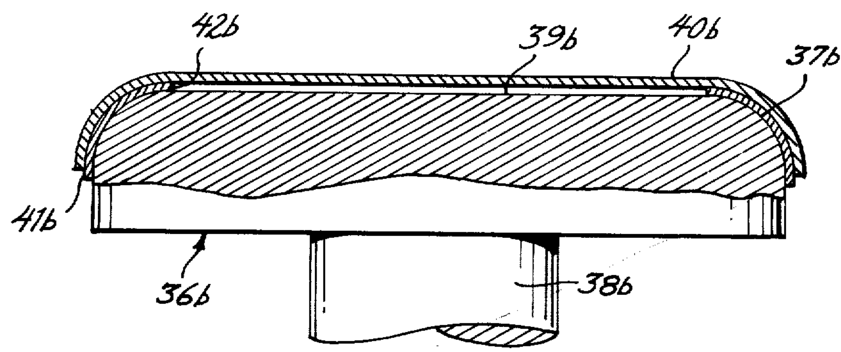
Fig.4.

METHOD OF MANUFACTURING CONTACT LENSES AND APPARATUS THEREFOR

CROSS-REFERENCES TO RELATED APPLICATIONS

This application is a Continuation-in-Part of my copending patent applications Ser. No. 92,444, filed Nov. 24, 1970 entitled METHOD OF MANUFACTURING CONTACT LENSES, now abandoned; and Ser. No. 217,084 filed Jan. 12, 1972 entitled METHOD OF MANUFACTURING CONTACT LENSES AND APPARATUS THEREFOR, now abandoned; and Ser. No. 281,234 filed Aug. 16, 1972 entitled METHOD OF MANUFACTURING CONTACT LENSES, now U.S. Pat. No. 3,772,832.

BACKGROUND OF THE INVENTION

The instant invention is closely related to said parent patent applications, and is broadly concerned with the production of contact lenses permitting of increased periods of toleration by the wearer, such that contact lenses may be worn for greater length of time without the wearer feeling annoyance or discomfort. The instant invention is also concerned with a novel method and apparatus for producing contact lenses where the permissible length or period of continuous wearing may be safely increased even in those cases where toleration of the wearer has not heretofore limited the permissible period of use.

SUMMARY OF THE INVENTION

It is an important object of the present invention to provide a highly improved method of manufacturing contact lenses, and apparatus for use therein, which method and apparatus are relatively simple for economy, reliability and accuracy, and which result in contact lenses affording greatly enhanced comfort to the wearer so that the span of toleration is greatly increased, and permissible length of continuous safe use is also greatly increased.

It is another object of the present invention to provide a contact lens method of manufacture and apparatus therefore which produce contact lenses having the advantageous characteristics mentioned in said copending patent application, and wherein the time, skill and tooling expense required in manufacture is substantially reduced.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a partial sectional view showing a lens of the present invention and illustrating certain successive manufacturing operations.

FIG. 2 is a longitudinal sectional view illustrating certain method steps and apparatus for manufacturing contact lenses in accordance with the teachings of the present invention.

FIG. 3 is a longitudinal sectional view similar to FIG. 2, but showing a slightly modified form of apparatus of the present invention.

FIG. 4 is a longitudinal sectional view similar to FIG. 3, but showing still another form of apparatus.

DESCRIPTION OF THE PREFERRED EMBODIMENTS

Referring now more particularly to the drawings, and specifically to FIG. 1 thereof, a semifinished lens or blank is there generally designated 10, and is illustrated in diametral cross-section, the lens being shown on one side of the lens center line 11. For clarity of illustration and ease of understanding, the cross-sectional lens configuration of FIG. 1 has been exaggerated and distorted in certain respects by the enlargement and rearrangement of certain areas which would otherwise be difficult to see in the permissible scale.

The semifinished lens 10 may have its concave side finished to a desired central or base curve 12, which curve is of a radius $R_1$ as required by a patient's prescription. On the other side of the lens 10 there may a convex formed aconvex curve or surface 13 which combines with the concave surface 12 to produce the necessary lens characteristic or correction. In the initial or semifinished condition, the concave surface 12 may extend to the peripheral surface or edge 15, as does the convex surface 13, the initial concave surface 12 and the convex surface 13 respectively terminating at intersections or junctures 16 and 17 with respect to the peripheral edge 15.

As described in said copending patent applications, or by other possible means, the lens 12 is ground and polished to form an annular surface or peripheral curve 20 having a radius of curvature $R_4$, which radius of curvature is relatively large as compared to the radius of curvature $R_1$ of base curve 12. Thus, the annular lens portion 21 is removed from the lens 12 by the formation of the annular circumferential concave surface 20. By this grinding and polishing operation to form the peripheral surface 20, the latter combines at a meeting with the base curve 12 to form therewith an annular edge or juncture 22.

By subsequent operation a lens working tool or tools are applied to the concave side of lens 10 to form an additional annular, concave peripheral surface or curve 23 having a radius of curvature $R_3$ which is of a magnitude between that of $R_4$ and $R_1$. That is, the radius $R_3$ is larger than the radius $R_1$ and smaller than the radius $R_4$. This operation effects removal of the annular region 24, to leave an annular meeting edge or juncture line 25 at the juncture of peripheral surface or curve 23 with peripheral surface or curve 20, and to leave an annular juncture 26 at the meeting edge with base curve or surface 12.

Similarly, a lens working tool or tools effect removal of an annular region 27 to leave a peripheral curve or annular surface 28 having a radius $R_2$. The radius $R_2$ is of a magnitude greater than that of $R_1$ and less than that of $R_3$. The peripheral curve or concave annular surface 28 combines to define an annular juncture 29 at its meeting edge with the curve or surface 23, and defines an additional annular juncture 30 at its meeting with the base curve 12.

As thus far described, the lens 10 may be formed by the method disclosed in my copending patent applications.

While lens 10 described above has been found satisfactory, particularly when produced with a multitude of peripheral curves so that the junctures are relatively minute, it is believed that even these minute junctures result in sensation to the wearer, which limit the length of wearing time.

In accordance with the improved method and apparatus of the present invention, the lens 10 of FIG. 1 may be mounted on or carried by a lens holder or chuck 35, the holder being suitably attached to the convex or front side of the lens, say for coaxial lens rotation, if desired. In this manner the concave or posterior side of the lens may be presented for further working in accordance with the teachings of the instant invention. Toward such end there is provided a lens working tool generally designated 36, which may have a generally spherical front surface 37 and may include a shaft or shank 38 extending through the center of curvature of surface 37, affording mounting means for effecting axial rotation of the tool. The tool 36 is formed on its working end, generally concentric with respect to the shank 38, with a generally circular central portion 39 which may be considered as of flatter or greater radius of curvature than the adjacent portion of surface 37 which surrounds and bounds the circular portion 39. That is, the circular portion 39 may be nonconvex or concave, as shown in the embodiment of FIG. 2. The terminology "nonconvex" as applied to the circular portion 39 may be considered as including surfaces flatter or of greater radius of curvature than the adjacent surrounding surface 37.

Disposed in covering relation with respect to the working end of the tool 36, extending across the circular, central portion 39 and overlying the adjacent portions or surface 37, is a polishing member or flexible sheet 40. The sheet 40 may be of a suitable polishing material, such as silk, moleskin, plastic tape, or other flexible, yieldable resilient film or sheet, and may be suitably secured in its covering relation with the working end of tool 36, as by adhesive securement thereto, or by means of a girding band, or other. As best seen in FIG. 2, the polishing sheet may be adhesively secured in facing engagement with the arcuate convex surface 37, while extending tautly across and in noncontacting or bridging relation with respect to the circular portion 39.

The tool 36 is selected and formed so that the diameter of the circular portion 39 is slightly greater than the diameter of annular juncture or ridge 25. By this relationship, with the tool 36 coaxially aligned with the lens 10, there may be effected relative concentric rotation between the tool and lens, with the polishing sheet 40 engaging and effectively smoothing and blending the annular juncture line or ridge 25 into the adjacent curves or surfaces 20 and 23. This above-described and illustrated smoothing or blending method and apparatus are repeated and employed for each of the juncture lines or ridges, as at 29 and 30, so that repetitious description and drawings of successive steps are not believed necessary. This achieves a complete, highly effective smoothing of the posterior peripheral region. While it is not believed possible to mathematically denote the curvature thus produced, being aspherical and resulting from the various curves as ordered by the prescribing doctor or optician, the prescription is accurately followed as dictated by the contour of the cornea for each individual patient, with the additional smoothing or bl blending at the curve junctures which was not heretofore obtained. As in the embodiment shown in FIG. 2, the polishing or acting region of the sheet 40 is not positively backed or supported, only a very small area on either side of the juncture will be polished or blended, so that the prescribed curves are effectively retained.

Under certain conditions it may be desirable to employ an emobidment such as shown in FIG. 3, wherein a tool **36*a* may be essentially similar to tool 36, having a generally convex arcuate external surface 37*a* and being carried by an axial shank 38*a*. However, the tool 36*a* differs from the tool 36 in that a central portion 39*a* may be of greater radius of curvature than surface 37*a*, in particular being of infinite radius of curvature or substantially planar. By this construction, a flexible polishing sheet 40*a* may be suitably secured in covering relation with the tool 36*a*, extending over the circular nonconvex portion 39*a* and adjacent portions of surface 37*a*. However, the polishing sheet 40*a* is positively supported or backed by facing engagement with the circular tool portion 39*a*. The juncture or ridge removal or blending achieved by employing the tool 36*a* in the manner described in connection with the tool 36** may be desirable when ridges or junctures of greater height are being smoothed or blended.

Another embodiment of the present invention is shown in FIG. 4, wherein a lens working tool is generally designated **36*b*, including a body having an arcuate convex surface 37*b* and axially carrying a shank 38*b***.

Secured in covering relation with the convex surface **37*b* is an inner sheet 41*b* which may also be of any suitable flexible sheet material. The inner sheet 41*b* is centrally apertured, as at 42*b*, which central aperture is generally circular and located coaxially with respect to shank 38*b*. The central aperture thus combines with the area of surface 37*b* bounded within the aperture to define a nonconvex circular portion 39*b***.

Arranged in covering relation with respect to the inner sheet 41b and extending in bridging relation across the aperture **42*b* and its nonconvex circular portion 39*b* is a polishing sheet 40*b*. The tool 36*b* of FIG. 4 may be employed in essentially the same manner as described hereinbefore in connection with tools 36 and 36*a*. However, it will be appreciated that the embodiment of FIG. 4 permits of wide variations in tooling with a minimum inventory. For example, the effective radius of curvature of tool 36*b* may be quickly and easily changed, as by substituting inner sheets 41*b* of different thicknesses or numbers of plies. Also, the diameter of the circular portion 39*b* may be quickly and easily changed by substituting an inner sheet 41*b* having a different diameter of circular aperture 42*b***, as desired.

It is, of course, appreciated that the effective external radius of curvature of a tool 36, **36*a* or 36*b* is that determined not only by the radius of curvature of surface 37, 37*a* and 37*b*, but the addition thereto of the thickness of the covering polishing sheet or polishing sheet and inner sheet. It is believed advantageous under most circumstances to maintain the effective radius of curvature of a tool 36, 36*a* or 36*b*** as less than that of the adjacent peripheral curves being operated upon or worked.

From the foregoing, it is seen that the method and apparatus of the present invention provide a contact lens of greater smoothness. However, it should also be understood that this increases smoothness or blending of juncture lines or ridges, serves to greatly enhance safety, comfort, safetyl, and length of time which a user may wear contact lenses of the present invention.

Although the present invention has been described in some detail by way of illustration and example for purposes of clarity of understanding, it is understood that certain changes and modifications may be made within the spirit of the invention.

What is claimed is:

1. In the method of manufacturing a contact lens wherein the concave lens side is provided with a central base curve, and a plurality of annular peripheral curves successively outwardly of each other and respectively of increased radius of curvature combining to form concentric annular meeting edges at their junctures, the steps which comprise: providing a generally convex lens working tool having a circular portion of diameter greater than the outermost juncture, said circular portion having a non-convex curvature, applying a polishing sheet in covering relation with said tool over said circular portion and the adjacent portion surrounding said circular portion, the radius of curvature of said sheet over said adjacent surrounding portion being less than that of the outermost peripheral curve, arranging said tool relative to said lens to engage the sheet region which is over said circular portion with said outermost juncture, effecting relative rotation between said lens and tool to smooth said outermost juncture, providing a second generally convex lens working tool having a circular portion of a diameter greater than the next outermost juncture, said circular portion of said second tool having a non-convex curvature, applying a second polishing sheet in covering relation with said second tool over the circular portion thereof and the adjacent portions surrounding said second tool circular portion, the radius of curvature of said second sheet over said adjacent portion of said second tool being less than that of the next outermost peripheral curve, arranging said second tool relative to said lens to engage the second sheet region which is over said central portion of said second tool with said next outermost juncture, and effecting relative rotation between said lens and said second tool to smooth said next outermost juncture.

2. The method according to claim 1, wherein said circular tool portion is concave.

3. The method according to claim 1, wherein said circular tool portion is generally planar.

4. The method according to claim 1, further characterized in effecting said relative rotation generally coaxially of said lens.

5. The method according to claim 1, further characterized in arranging said tools with said circular portions concentric with said outermost and next outermost junctures, and effecting said relative rotation generally coaxially of said lens.

6. The method according to claim 1, one of said tools comprising a body having a generally convex surface, and an inner sheet secured in facing engagement with said surface, said inner sheet having a generally circular through hole defining said circular portion of said one tool.

7. Contact lens manufacturing apparatus for smoothing the annular juncture of peripheral curves, said apparatus comprising a holder for holding engagement with the convex side of a lens, and a generally convex lens working tool having a non-convex circular portion of a diameter greater than the outermost annular juncture, and a polishing sheet in covering relation with said tool over said circular portion and the portion adjacent to said circular portion, the radius of curvature of said sheet over said portion adjacent to said circular portion being less than that of the outermost peripheral curve, whereby relative rotation between said tool and lens with the latter engaging the sheet region over said circular portion effects smoothing of the outermost juncture.

8. Contact lens manufacturing apparatus according to claim 7, said working tool comprising a body having a generally convex surface, and an inner sheet secured in facing engagement with said surface, said inner sheet having a generally circular through hole defining a non-convex surface portion.

9. Contact lens manufacturing apparatus according to claim 7, said polishing sheet being of flexible yieldable material.

* * * * *